US010764958B2

(12) United States Patent
Shi et al.

(10) Patent No.: US 10,764,958 B2
(45) Date of Patent: Sep. 1, 2020

(54) TRANSMISSION APPARATUS AND METHOD OF STATUS INDICATION AND COMMUNICATION SYSTEM

(71) Applicant: FUJITSU LIMITED, Kawasaki-shi, Kanagawa (JP)

(72) Inventors: Yulong Shi, Beijing (CN); Meiyi Jia, Beijing (CN); Lianhai Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 32 days.

(21) Appl. No.: 16/114,768

(22) Filed: Aug. 28, 2018

(65) Prior Publication Data
US 2018/0368203 A1 Dec. 20, 2018

Related U.S. Application Data

(63) Continuation of application No. PCT/CN2016/079424, filed on Apr. 15, 2016.

(51) Int. Cl.
H04W 76/28 (2018.01)
H04W 28/06 (2009.01)
(Continued)

(52) U.S. Cl.
CPC ........... *H04W 76/28* (2018.02); *H04L 1/1671* (2013.01); *H04L 5/0053* (2013.01); *H04W 24/10* (2013.01);
(Continued)

(58) Field of Classification Search
CPC .... H04L 1/1671; H04L 5/0053; H04W 24/10; H04W 28/06; H04W 52/0216; H04W 52/0229; H04W 76/28
See application file for complete search history.

(56) References Cited

U.S. PATENT DOCUMENTS 8,284,722 B2 * 10/2012 Park ...................... H04W 72/14
370/329
2010/0172313 A1 * 7/2010 Ho ...................... H04W 72/042
370/329
(Continued)

FOREIGN PATENT DOCUMENTS

CN 103138905 A 6/2013
CN 103260251 A 8/2013
(Continued)

OTHER PUBLICATIONS

International Search Report issued by the State Intellectual Property Office of China for corresponding International Patent Application No. PCT/CN2016/079424, dated Jan. 20, 2017, with an English translation.

(Continued)

Primary Examiner — Chi H Pham
Assistant Examiner — Weibin Huang
(74) Attorney, Agent, or Firm — Myers Wolin, LLC

(57) ABSTRACT

A transmission apparatus and method of status indication and a communication system. The transmission method of status indication includes: determining whether an RLC layer has successfully received all RLC PDUs of uplink data when a base station receives the uplink data transmitted by a UE; and transmitting PDCCH information to the UE, in a case where the RLC layer has successfully received all the RLC PDUs of the uplink data; the PDCCH information is used to indicate that the uplink data have been successfully received and/or the UE is permitted to enter into a DRX status. Hence, not only transmission of RLC status report may be reduced and transmission efficiency of the whole system may be improved, but also the UE may be made to enter into the DRX status as fast as possible and power consumption of the UE may be lowered.

20 Claims, 8 Drawing Sheets

(51) Int. Cl.
  *H04W 52/02* (2009.01)
  *H04L 1/16* (2006.01)
  *H04L 5/00* (2006.01)
  *H04W 24/10* (2009.01)
  *H04W 72/04* (2009.01)

(52) U.S. Cl.
  CPC ....... *H04W 28/06* (2013.01); *H04W 52/0216* (2013.01); *H04W 52/0229* (2013.01); *H04W 72/042* (2013.01); *Y02D 70/00* (2018.01); *Y02D 70/20* (2018.01)

(56) References Cited

U.S. PATENT DOCUMENTS

| | | | |
|---|---|---|---|
| 2012/0087314 A1* | 4/2012 | Maeda | H04L 1/1812 370/328 |
| 2012/0113942 A1 | 5/2012 | Kim | |
| 2012/0176983 A1* | 7/2012 | Iwamura | H04W 72/1289 370/329 |
| 2012/0257570 A1* | 10/2012 | Jang | H04L 1/1854 370/328 |
| 2014/0018085 A1* | 1/2014 | Young | H04W 76/28 455/450 |
| 2014/0254528 A1* | 9/2014 | Quan | H04L 5/0055 370/329 |
| 2014/0362796 A1 | 12/2014 | Seo et al. | |
| 2015/0009936 A1 | 1/2015 | Quan et al. | |
| 2015/0110034 A1* | 4/2015 | Yang | H04L 5/0055 370/329 |
| 2015/0117337 A1* | 4/2015 | Choi | H04L 1/1854 370/329 |
| 2016/0294531 A1* | 10/2016 | Loehr | H04W 72/0446 |

FOREIGN PATENT DOCUMENTS

| | | |
|---|---|---|
| CN | 104040913 A | 9/2014 |
| WO | 2015/084637 A1 | 6/2015 |

OTHER PUBLICATIONS

Written Opinion of the International Searching Authority issued by the State Intellectual Property Office of China for corresponding International Patent Application No. PCT/CN2016/079424, dated Jan. 20, 2017, with an English translation.

* cited by examiner

TRANSMISSION APPARATUS AND METHOD OF STATUS INDICATION AND COMMUNICATION SYSTEM

CROSS REFERENCE TO RELATED APPLICATIONS

This application is a continuation application of International Application PCT/CN2016/079424 filed on Apr. 15, 2016, the entire contents of which are incorporated herein by reference.

TECHNICAL FIELD

This disclosure relates to the field of communication technologies, and in particular to a transmission apparatus and method of status indication and a communication system.

BACKGROUND

As demands for application of Internet of Things (IoT) in next generation mobile communication networks become wider and wider, a new wireless communication technology is under study in the 3rd Generation Partnership Project (3GPP), namely, a subject on Narrowband Internet of Things (NB-IoT) technology, so as to support IoT traffics.

The IoT traffics have many new features, including extra-low power consumption requirement, deployment of massive user equipments, relatively few data traffic, and low requirement on traffic latency, etc. Such features place many technical requirements on a long-term evolution (LTE) system, an important requirement in which is the extra-low power consumption requirement on the user equipment.

The NB-IoT technology is a new narrowband communication technology that is further enhanced and based on existing LTE technologies. In uplink data transmission of the NB-IoT, a media access control (MAC) layer uses asynchronous transmission, and feedback information of its uplink transmission is indicated by scheduling information of a physical downlink control channel (PDCCH).

For example, if a user equipment (UE) receives a PDCCH scheduling new data after transmitting uplink data, it shows that transmission of the uplink data is successful. And if the UE receives a PDCCH scheduling retransmission, it shows that the transmission of the uplink data fails, and retransmission of the MAC layer needs to be performed. For a UE configured with discontinuous reception (DRX), a drx-inactivityTimer shall be started after the PDCCH scheduling new data is received. The UE enters into a DRX status only when the drx-inactivityTimer expires or a discontinuous reception command (DRX command) from a network side is received, so as to lower power consumption.

On the other hand, in the transmission of uplink data of the NB-IoT, a radio link control (RLC) layer of the UE determines whether the uplink data have been successfully received via a status report (SR) fed back by a receiving device. A transmitting device only carries a poll bit in a last uplink datum, so as to show that the datum is the last datum. And after receiving the last uplink datum, the receiving device will indicate to the transmitting device in a form of an RLC status report that the uplink data have been successfully received, or indicate lost data.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in an NB-IoT system, for example, amounts of uplink data of most applied are relatively small, which may be carried by an RLC protocol data unit (PDU). In normal cases, the RLC PDU may be successfully transmitted in a mechanism of hybrid automatic repeat request (HARQ) of one or more MAC PDUs. At this case, the RLC status report fed back by the receiving device needs not to indicate which data are lost, and only one bit of information is needed to shown that the uplink data of the UE are successfully received.

In such cases, according to existing schemes, in addition to transmitting the uplink data, the UE needs further to receive the RLC status report. However, the RLC status report is only one bit of information indicating complete successful reception, hence, a transmission efficiency of the whole system is relatively low. And on the other hand, after the UE finishes transmission of all uplink data, even though there exist no downlink data needing to be received, it still needs to proceed with monitoring PDCCHs, and will not enter into the DRX status which is more power-saving until the drx-inactivityTimer expires. In this way, power consumption of the UE is relatively high.

Embodiments of this disclosure provide a transmission apparatus and method of status indication and a communication system, in which uplink data of a UE having been successfully received and/or a UE being permitted to enter into a DRX status is/are indicated by PDCCH information, which may not only improve transmission efficiency of the whole system, but also lower power consumption of the UE.

According to a first aspect of the embodiments of this disclosure, there is provided a transmission method of status indication, including:

determining whether a radio link control layer has successfully received all radio link control protocol data units of uplink data when a base station receives the uplink data transmitted by a UE; and transmitting physical downlink control channel information to the UE, in a case where the radio link control layer has successfully received all the radio link control protocol data units of the uplink data; wherein, the physical downlink control channel information is used to indicate that the uplink data have been successfully received and/or the UE is permitted to enter into a discontinuous reception (DRX) status.

According to a second aspect of the embodiments of this disclosure, there is provided a transmission apparatus of status indication, configured in a base station, the transmission apparatus including:

a reception determining unit configured to determine whether a radio link control layer has successfully received all radio link control protocol data units of uplink data when the base station receives the uplink data transmitted by a UE; and an information transmitting unit configured to transmit physical downlink control channel information to the UE, in a case where the radio link control layer has successfully received all the radio link control protocol data units of the uplink data; wherein, the physical downlink control channel information is used to indicate that the uplink data have been successfully received and/or the UE is permitted to enter into a DRX status.

According to a third aspect of the embodiments of this disclosure, there is provided a transmission method of status indication, including:

monitoring a physical downlink control channel after a UE transmits uplink data; and receiving physical downlink control channel information transmitted by a base station via the physical downlink control channel, the physical downlink control channel information being used to indicate that the uplink data have been successfully received and/or the UE is permitted to enter into a DRX status.

According to a fourth aspect of the embodiments of this disclosure, there is provided a transmission apparatus of status indication, configured in a UE, the transmission apparatus of status indication including:

a channel monitoring unit configured to monitor a physical downlink control channel after the UE transmits uplink data; and an information receiving unit configured to receive physical downlink control channel information transmitted by a base station via the physical downlink control channel, the physical downlink control channel information being used to indicate that the uplink data have been successfully received and/or the UE is permitted to enter into a DRX status.

According to a fifth aspect of the embodiments of this disclosure, there is provided a communication system, including:

a base station including the transmission apparatus of status indication as described in the second aspect; and a UE including the transmission apparatus of status indication as described in the fourth aspect.

An advantage of the embodiments of this disclosure exists in that, uplink data of a UE having been successfully received and/or a UE being permitted to enter into a DRX status is/are indicated by PDCCH information, which may not only reduce transmission of RLC status report and improve transmission efficiency of the whole system, but also the UE may be made to enter into the DRX status as fast as possible and power consumption of the UE may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of status features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort.

In the Drawings:

FIG. 1 is a flowchart of the transmission method of status indication of Embodiment 1 of this disclosure;

FIG. 2 is another flowchart of the transmission method of status indication of Embodiment 1 of this disclosure;

FIG. 3 is a further flowchart of the transmission method of status indication of Embodiment 1 of this disclosure;

FIG. 4 is still another flowchart of the transmission method of status indication of Embodiment 1 of this disclosure;

FIG. 5 is a flowchart of the transmission method of status indication of Embodiment 2 of this disclosure;

FIG. 6 is another flowchart of the transmission method of status indication of Embodiment 2 of this disclosure;

FIG. 7 is a schematic diagram of the transmission apparatus of status indication of Embodiment 3 of this disclosure;

FIG. 8 is a schematic diagram of the transmission apparatus of status indication of Embodiment 4 of this disclosure;

FIG. 9 is a schematic diagram of the communication system of Embodiment 5 of this disclosure;

FIG. 10 is a schematic diagram of the base station of Embodiment 5 of this disclosure; and FIG. 11 is a schematic diagram of the UE of Embodiment 5 of this disclosure.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described with reference to the accompanying drawings. These embodiments are illustrative only, and are not intended to limit this disclosure.

In this disclosure, a base station may be referred to as an access point, a broadcast transmitter, a node B, or an evolution node B (eNB), etc., and may include some or all of the functions of them. A term "base station" shall be used in the text, and each base station provides communication coverage for a specific geographical region.

In this disclosure, a mobile station or equipment may be referred to as a user equipment (UE). A UE may be fixed or mobile, and may also be referred to as a mobile station, a terminal, an access terminal, a user unit, or a station, etc. A UE may be a cellular phone, a personal digital assistant (PDA), a wireless modem, a wireless communication device, a handhold device, a lap-top computer, a cordless telephone, and a vehicle, etc.

The embodiments of this disclosure shall be described below with reference to the accompanying drawings.

Embodiment 1

The embodiment of the present disclosure provides a transmission method of status indication, which shall be described from a base station.

Figure 1:
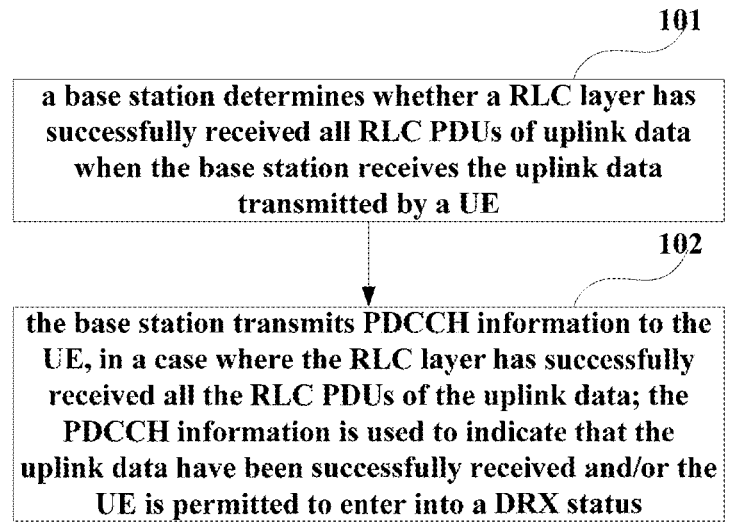

FIG. 1 is a flowchart of the transmission method of status indication of the embodiment of this disclosure. As shown in FIG. 1, the transmission method includes:

Block 101: a base station determines whether a radio link control layer has successfully received all radio link control protocol data units of uplink data when the base station receives the uplink data transmitted by a UE; and Block 102: the base station transmits physical downlink control channel information to the UE, in a case where the radio link control layer has successfully received all the radio link control protocol data units of the uplink data; the physical downlink control channel information is used to indicate that the uplink data have been successfully received and/or the UE is permitted to enter into a discontinuous reception status.

In an embodiment, the UE may be, for example, a terminal of an NB-IoT system. However, this disclosure is not limited thereto; for example, the UE may also be a terminal of another network system. The embodiments of this disclosure shall be described by taking the NB-IoT system as an example. However, this disclosure is not limited thereto, and it is applicable to any system performing transmission of status indication.

In an embodiment, the base station may be a base station of a cell to which the UE belongs, and may be a macro base station (such as an eNB), and the UE may be served by a macro cell generated by the macro base station. And the base station in the embodiments of this disclosure may also be a pico base station, and the UE may be served by a pico cell (or a micro cell) generated by the pico base station. However, this disclosure is not limited thereto, and a particular scenario may be determined according to an actual situation.

In an embodiment, the uplink data may include one or more RLC PDUs, and when the UE transmits the last uplink datum (such as an RLC PDU), the last uplink datum may carry a poll bit, which is used to notify the base station that this datum is the last uplink datum. Hence, the RLC layer of the base station may determine whether all RLC PDUs of the uplink data have been successfully received.

For example, when an RLC layer of an eNB receives the last RLC PDU of the UE, if the RLC layer successfully receives all the uplink RLC PDUs of the UE, that is, there exists no lost RLC PDU, the RLC layer of the eNB indicates the MAC layer to notify the UE via the PDCCH of status information on data transmission by the RLC layer, and transmission of an RLC status report is not needed.

Figure 2:
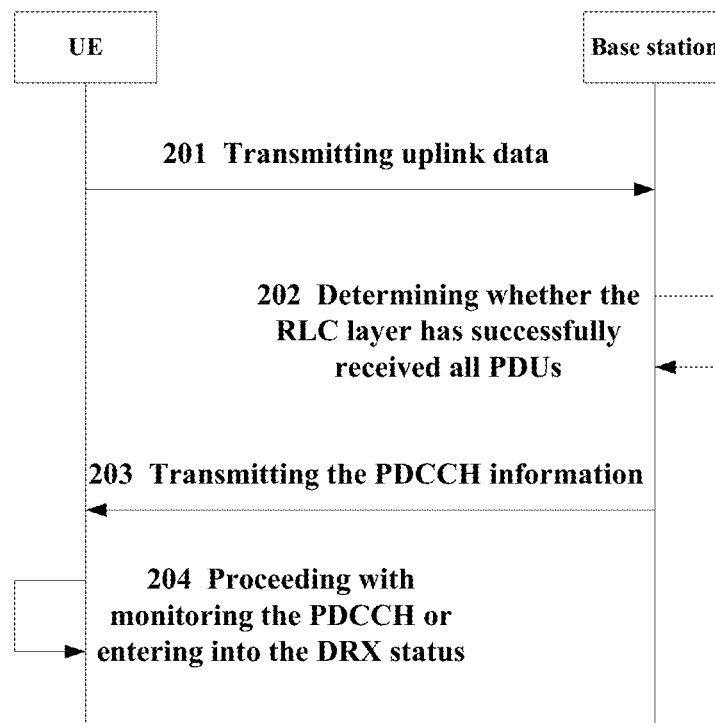

FIG. 2 is another flowchart of the transmission method of status indication of the embodiment of this disclosure, which shall be described from a base station side and a UE side. As shown in FIG. 2, the transmission method includes:

201: a base station receives uplink data transmitted by a UE;

202: the base station determines whether the RLC layer has successfully received all the RLC PDUs of the uplink data;

203: the base station transmits the PDCCH information to the UE.

In an embodiment, the base station transmits PDCCH information to the UE, in a case where the RLC layer has successfully received all the RLC PDUs of the uplink data; the PDCCH information is used to indicate that the uplink data have been successfully received and/or the UE is permitted to enter into a DRX status; furthermore, in a case where the RLC layer have not successfully received all the RLC PDUs of the uplink data, a scheme of RLC status report may be adopted, and reference may be made to the relevant art, which shall not be described herein any further.

204: the UE proceeds with monitoring the PDCCH according to the PDCCH information or entering into the DRX status.

In an embodiment, in a case where the base station has successfully received all the RLC PDUs of the uplink data and there exist downlink data for the UE needing to be transmitted, the UE may proceed with monitoring the PDCCH according to the PDCCH information, and in a case where the base station has successfully received all the RLC PDUs of the uplink data and there exist no downlink data for the UE needing to be transmitted, the UE may enter into the DRX status, or enter into the DRX status after performing feedback, according to the PDCCH information.

In the DRX status, the UE needs only relatively low power consumption, and reference may be made to relevant art for details of the DRX mechanism, which shall not be described herein any further. Furthermore, after receiving PDCCH information of "permitting the UE to enter into the DRX status", the UE may immediately enter into the DRX status, or may enter into the DRX status immediately after performing feedback, or may enter into the DRX status after a predetermined period of time (such as 1 millisecond), or may enter into the DRX status immediately after performing other necessary operations. However, this embodiment is not limited thereto, and particular processing may be performed as actually demanded.

In an embodiment, in a case where the RLC layer has successfully received all the RLC PDUs of the uplink data, the base station may directly indicate to the UE via the PDCCH that the uplink data have been successfully received, and/or the UE is permitted to enter into the DRX status. Hence, an RLC status report is not needed to be transmitted, transmission efficiency of the whole system may be improved; and the UE may be made to enter into the DRX status as fast as possible and power consumption of the UE may be lowered.

This disclosure shall be further described below by taking three types of PDCCH information as examples.

Figure 3:
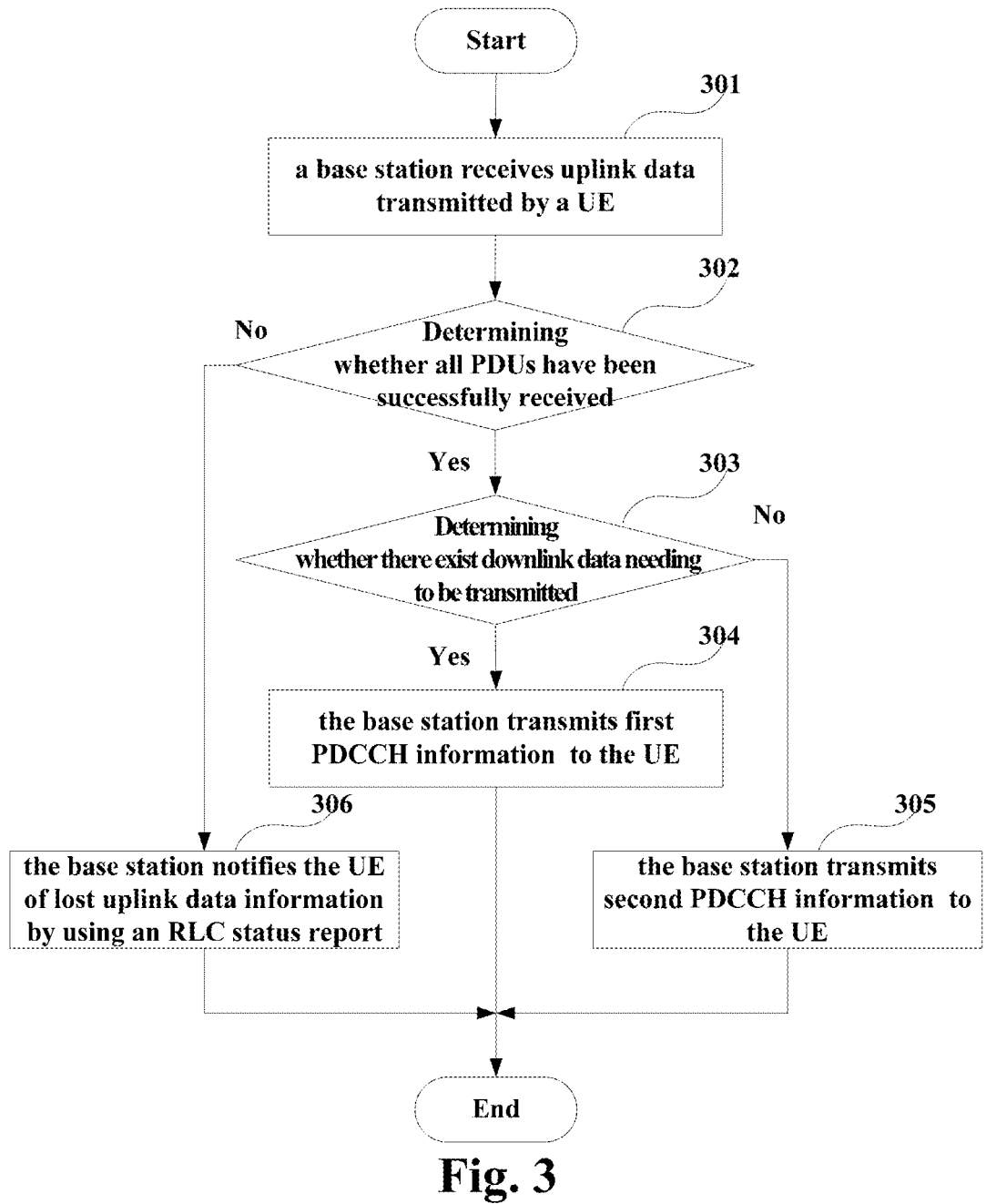

FIG. 3 is a further flowchart of the transmission method of status indication of the embodiment of this disclosure. As shown in FIG. 3, the transmission method includes:

Block 301: a base station receives uplink data transmitted by a UE.

Block 302: the base station determines whether the RLC layer has successfully received all the RLC PDUs of the uplink data, and executing block 303 when all the RLC PDUs have been successfully received, otherwise, executing block 306.

Block 303: the base station determines whether there exist downlink data for the UE needing to be transmitted, and executing block 304 when there exist downlink data for the UE needing to be transmitted, otherwise, executing block 305.

Block 304: the base station transmits first PDCCH information to the UE, the first PDCCH information being used to indicate that the uplink data have been successfully received.

For example, after determining that all the uplink data have been successfully received, the RLC layer of the base station may inform a message of successful reception to the MAC layer; and if there still exist downlink data for the UE needing to be scheduled or transmitted in the MAC layer of the base station, the base station may determine and transmit the first PDCCH information via a physical layer, that is, indicating via the PDCCH to the UE that the RLC PDUs transmitted in an uplink have all been successfully received, but the UE is not permitted to enter into the DRX status immediately.

Block 305: the base station transmits second PDCCH information to the UE, the second PDCCH information being used to indicate that the uplink data have been successfully received and the UE is permitted to enter into the DRX status.

For example, after determining that all the uplink data have been successfully received, the RLC layer of the base station may inform a message of successful reception to the MAC layer; and if there exist no downlink data for the UE needing to be scheduled or transmitted in the MAC layer of the base station, the base station may determine and transmit the second PDCCH information via a physical layer, that is, indicating via the PDCCH to the UE that the RLC PDUs transmitted in an uplink manner have all been successfully received, and the UE is permitted to enter into the DRX status (for example, it enters into the DRX status immediately after receiving the second PDCCH information).

Block 306: the base station notifies the UE of lost uplink data information by using an RLC status report.

For example, if the base station detects that at least one RLC PDU is lost, it notifies the UE of which RLC PDUs are lost via a legacy RLC status report.

It should be noted that FIG. 3 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. And appropriate modifications may be made by those skilled in the art according to what is described above, without being limited to those contained in FIG. 3.

Figure 4:
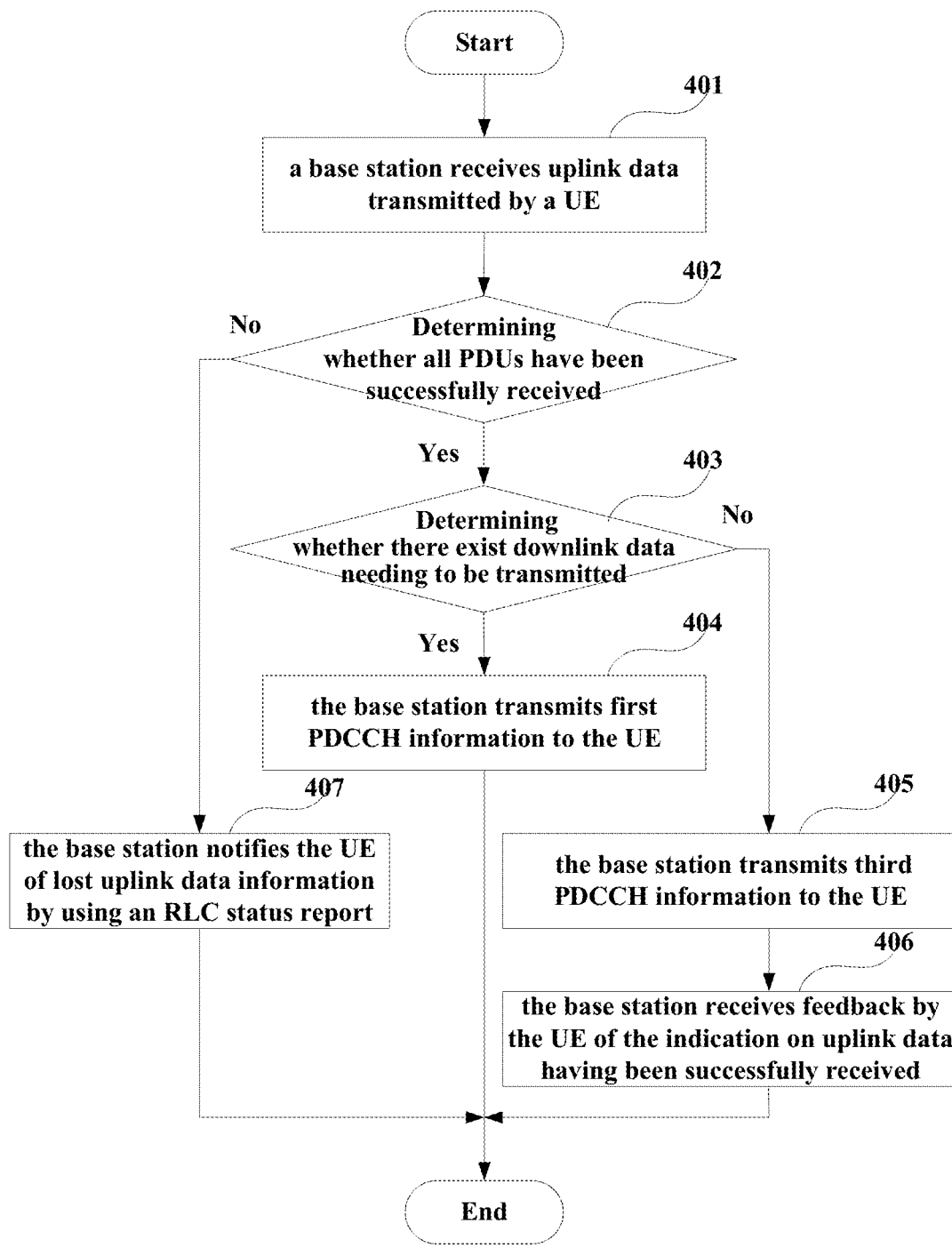

FIG. 4 is a further flowchart of the transmission method of status indication of the embodiment of this disclosure. As shown in FIG. 4, the transmission method includes:

Block 401: a base station receives uplink data transmitted by a UE.

Block 402: the base station determines whether the RLC layer has successfully received all the RLC PDUs of the uplink data, and executing block 403 when all the RLC PDUs have been successfully received, otherwise, executing block 407.

Block 403: the base station determines whether there exist downlink data for the UE needing to be transmitted, and executing block 404 when there exist downlink data for the UE needing to be transmitted, otherwise, executing block 405.

Block 404: the base station transmits first PDCCH information to the UE, the first PDCCH information being used to indicate that the uplink data have been successfully received.

For example, after determining that all the uplink data have been successfully received, the RLC layer of the base station may inform a message of successful reception to the MAC layer; and if there still exist downlink data for the UE needing to be scheduled or transmitted in the MAC layer of the base station, the base station may determine and transmit the first PDCCH information via a physical layer, that is, indicating via the PDCCH to the UE that the RLC PDUs transmitted in an uplink have all been successfully received, but the UE is not permitted to enter into the DRX status immediately.

Block 405: the base station transmits third PDCCH information to the UE, the third PDCCH information being used to indicate that the uplink data have been successfully received and the UE is permitted to enter into the DRX status after performing feedback.

For example, after determining that all the uplink data have been successfully received, the RLC layer of the base station may inform a message of successful reception to the MAC layer; and if there exist no downlink data for the UE needing to be scheduled or transmitted in the MAC layer of the base station, the base station may determine and transmit the third PDCCH information via a physical layer, that is, indicating via the PDCCH to the UE that the RLC PDUs transmitted in an uplink manner have all been successfully received, and the UE is permitted to enter into the DRX status after performing feedback of the indication (for example, it enters into the DRX status immediately after performing feedback).

In an embodiment, the third PDCCH information may include resources for the UE to perform feedback, and the UE may use the resources to feed back the indication that denoting the uplink data have been successfully received.

Block 406: the base station receives feedback by the UE of the indication denoting that the uplink data have been successfully received; and Block 407: the base station notifies the UE of lost uplink data information by using an RLC status report.

For example, if the base station detects that at least one RLC PDU is lost, it notifies the UE of which RLC PDUs are lost via a legacy RLC status report.

It should be noted that FIG. 4 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. And appropriate modifications may be made by those skilled in the art according to what is described above, without being limited to those contained in FIG. 4.

Furthermore, description is given in FIG. 3 by taking the first PDCCH information and the second PDCCH information as examples, and description is given in FIG. 4 by taking the first PDCCH information and the third PDCCH information as examples; however, this disclosure is not limited thereto. For example, the first PDCCH information, the second PDCCH and the third PDCCH information may all be used. Moreover, the PDCCH information in this disclosure is not limited to the above three types. For example, a type of PDCCH information may be added for use in directly permitting the UE to immediately enter into the DRX status, etc.

Hence, the uplink data of the UE having all been successfully received and/or the UE being permitted to enter into the DRX status is/are indicated by the PDCCH information, which may not only reduce the power consumption of the UE in receiving the RLC status report after the transmission of the uplink data is finished, but also the power consumption of the UE in monitoring the PDCCH during operation of the drx-InactiveTimer after the transmission of the uplink data is finished.

The operational flow of this disclosure is schematically described above, and the PDCCH information shall be described below. Description shall be given by taking the above three types of PDCCH information (i.e. the first PDCCH information, the second PDCCH information and the third PDCCH information) as examples. Such PDCCH information may be indicated on a physical downlink channel of an NB-IoT system, such as an NB-PDCCH; however, this disclosure is not limited thereto. For example, it may also be a PDCCH of another system; and furthermore, the PDCCH information is not limited to the above three types, and a particular type may be determined according to as actual situation.

In an embodiment, a newly-added field in a downlink control information (DCI) format of a PDCCH, for example, may be used for carrying the PDCCH information.

In one implementation, the newly-added field (i.e. DCI), for example, may include a flag field, having a length of 1 bit, for example; a value 0 of the flag field denotes that the DCI is used to carry the PDCCH information, and a value 1 of the flag field denotes that the DCI is used for ordinary resource scheduling or information feedback, and fields after the DCI are contents specified in a protocol.

However, this disclosure is not limited thereto; for example, the value 1 of the flag field denotes that the newly-added field is used to carry the PDCCH information, and the value 0 of the flag field denotes that the newly-added field is used for ordinary downlink resource scheduling.

In this implementation, the newly-added field may further include, for example, a direct indication information field, a value of the direct indication information field denoting the first PDCCH information, and another value of the direct indication information field denoting the second PDCCH information.

For example, the direct indication information field is of 1 bit, a value 1 of the direct indication information field denotes the first PDCCH information, and a value 0 of the direct indication information field denotes the second PDCCH information. However, this disclosure is not limited thereto; for example, the field may have more bits, which may denote more types of PDCCH information.

In this implementation, the newly-added field may further include reserve information bits. For example, sufficient bits are supplemented so that a length of the DCI is the same as a length of the DCI when the flag field is 1.

In another implementation, the newly-added field (i.e. DCI), for example, may include a flag field, having a length of 1 bit, for example; a value 0 of the flag field denotes that the DCI is used to carry the PDCCH information, and a value 1 of the flag field denotes that the DCI is used for ordinary resource scheduling or information feedback, and fields after the DCI are contents specified in a protocol.

However, this disclosure is not limited thereto; for example, the value 1 of the flag field denotes that the newly-added field is used to carry the PDCCH information, and the value 0 of the flag field denotes that the newly-added field is used for ordinary downlink resource scheduling.

In this implementation, the newly-added field may further include, for example, a direct indication information field, a value of the direct indication information field denoting the first PDCCH information, and another value of the direct indication information field denoting the third PDCCH information.

For example, the direct indication information field is of 1 bit, a value 1 of the direct indication information field denotes the first PDCCH information, and a value 0 of the direct indication information field denotes the third PDCCH information. However, this disclosure is not limited thereto; for example, the field may have more bits, which may denote more types of PDCCH information.

In this implementation, the newly-added field may further include, for example, a resource block assignment field, a value of the resource block assignment field being used to indicate resources used by the UE in performing the feedback (such as uplink resource positions used by the UE in performing feedback of PDCCH information).

In this implementation, the newly-added field may further include reserve information bits. For example, sufficient bits are supplemented so that a length of the DCI is the same as a length of the DCI when the flag field is 1.

It should be noted that using the newly-added field in the DCI format to carry the PDCCH information is schematically described above by way of examples. However, this disclosure is not limited thereto; for example, other implementations of the newly-added field in the DCI format may also be used.

In this embodiment, an existing field in the DCI format of the PDCCH may also be used to carry the PDCCH information.

For example, a value 0 of a repetition number field in the DCI format may denote the first PDCCH information; and for another example, a value 0 of a subframe repetition number field in the DCI format may denote the second PDCCH information.

It should be noted that using the existing fields in the DCI format to carry the PDCCH information is schematically described above by way of examples. However, this disclosure is not limited thereto; for example, other existing fields in the DCI format may also be used to carry the PDCCH information.

It can be seen from the above embodiment that uplink data of the UE having been successfully received and/or the UE being permitted to enter into a DRX status is/are indicated by PDCCH information, which may not only reduce transmission of RLC status report and improve transmission efficiency of the whole system, but also the UE may be made to enter into the DRX status as fast as possible and power consumption of the UE may be lowered.

Embodiment 2

The embodiment of the present disclosure provides a transmission method of status indication, which shall be described from a UE side, with contents identical to those in Embodiment) being not going to be described herein any further.

Figure 5:
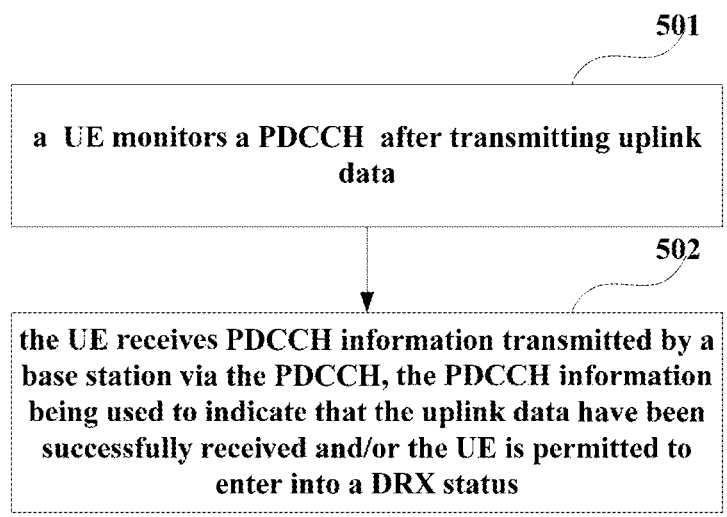

FIG. 5 is a flowchart of the transmission method of status indication of the embodiment of this disclosure. As shown in FIG. 5, the transmission method includes:

Block 501: a UE monitors a PDCCH after transmitting uplink data; and

Block 502: the UE receives PDCCH information transmitted by a base station via the PDCCH, the PDCCH information being used to indicate that the uplink data have been successfully received and/or the UE is permitted to enter into a DRX status.

Hence, the uplink data of the UE having been all successfully received and/or the UE being permitted to enter into the DRX status is/are indicated by the PDCCH information, which may not only reduce the power consumption of the UE in receiving the RLC status report after the transmission of the uplink data is finished, but also the power consumption of the UE in monitoring the PDCCH during operation of the drx-InactiveTimer after the transmission of the uplink data is finished.

Figure 6:
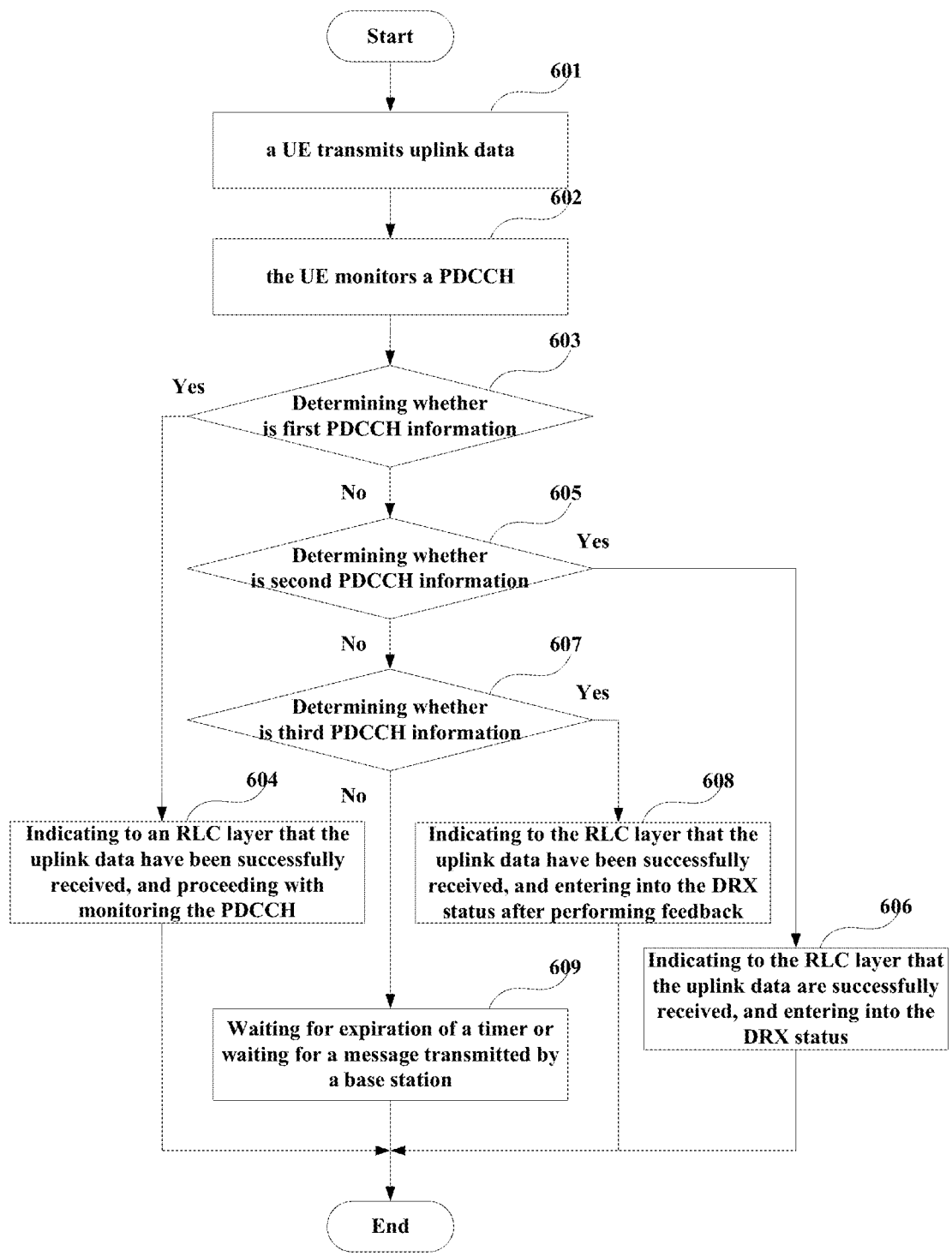

FIG. 6 is another flowchart of the transmission method of status indication of the embodiment of this disclosure. As shown in FIG. 6, the transmission method includes:

Block 601: a UE transmits uplink data.

Block 602: the UE monitors a PDCCH.

For example, the UE may continuously monitor the PDCCH after transmitting the last uplink datum (such as the last RLC PDU), thereby receiving PDCCH information transmitted by a base station via the PDCCH.

Block 603: the UE determines whether the received PDCCH information is first PDCCH information, and executing block 604 if it is the first PDCCH information, otherwise, executing block 605.

In an embodiment, the received PDCCH information may be the first PDCCH information, or may be the second PDCCH information, or may be the third PDCCH information, the first PDCCH information being used to indicate that the uplink data have been successfully received, the second PDCCH information being used to indicate that the uplink data have been successfully received and the UE is permitted to enter into a DRX status, and the third PDCCH information being used to indicate that the uplink data have been successfully received and the UE is permitted to enter into a DRX status after performing feedback.

Block 604: the UE indicates to an RLC layer that the uplink data have been successfully received, and proceeding with monitoring the PDCCH.

In an embodiment, if the UE receives the first PDCCH information in the PDCCH, it deems that all RLC PDUs transmitted previously have been successfully received, and the UE indicates a message of successful reception to the RLC layer; furthermore, the UE proceeds with monitoring the PDCCH during operation of a drx-InactiveTimer, but does not enter into the DRX status.

Block 605: the UE determines whether the PDCCH information is second PDCCH information, and executing block 606 if it is the second PDCCH information, otherwise, executing block 607.

Block 606: the UE indicates to the RLC layer that the uplink data have been successfully received, and entering into the DRX status.

In an embodiment, if the UE receives the second PDCCH information in the PDCCH, it deems that all RLC PDUs transmitted previously have been successfully received, and the UE indicates a message of successful reception to the RLC layer; and the UE deems that the base station permits it to enter into the DRX status, hence, it enters into the DRX status (for example, it enters into the DRX status immediately after receiving the second PDCCH information).

Block 607: the UE determines whether the PDCCH information is third PDCCH information, and executing block 608 if it is the third PDCCH information, otherwise, executing block 609.

Block 608: the UE indicates—to the RLC layer that the uplink data have been successfully received, and entering into the DRX status after performing feedback.

In an embodiment, if the UE receives the third PDCCH information in the PDCCH, it deems that all RLC PDUs transmitted previously have been successfully received, and the UE indicates a message of successful reception to the RLC layer; and the UE deems that the base station permits it to enter into the DRX status, and the UE enters into the DRX status after transmitting feedback of the successfully received PDCCH information (for example, it enters into the DRX status immediately after feeding back). In transmitting the feedback information, the UE may use an uplink physical resource indicated by the third PDCCH information.

Block 609: the UE waits for expiration of a timer or waits for a message transmitted by the base station.

In an embodiment, if the UE does not detect the above three types of PDCCH information in the PDCCH, the UE may receive an RLC status report transmitted by the base station, as described in relevant arts. Furthermore, the UE may not enter into the DRX status until a DRX command transmitted by the base station is received or expiration of the drx-InactiveTimer arrives.

It should be noted that FIG. 6 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. And appropriate modifications may be made by those skilled in the art according to what is described above, without being limited to those contained in FIG. 6.

For example, only the first PDCCH information and the second PDCCH information may be used, and blocks 607 and 608 may be omitted; or only the first PDCCH information and the third PDCCH information may be used, and blocks 605 and 606 may be omitted; or more PDCCH information may be added, and more blocks or steps may be added.

In an embodiment, a newly-added field in a DCI format of a PDCCH may be used to carry the PDCCH information, or an existing field in the DCI format of the PDCCH may be used to carry the PDCCH information. However, this disclosure is not limited thereto, and reference may be made to related contents in Embodiment 1 for details.

It can be seen from the above embodiment that uplink data of the UE having been successfully received and/or the UE being permitted to enter into a DRX status is/are indicated by PDCCH information, which may not only reduce transmission of RLC status report and improve transmission efficiency of the whole system, but also the UE may be made to enter into the DRX status as fast as possible and power consumption of the UE may be lowered.

Embodiment 3

The embodiment of the present disclosure provides a transmission apparatus of status indication, configured in a base station. This embodiment corresponds to the transmission method in Embodiment 1, with the same contents being not going to be described herein any further.

Figure 7:
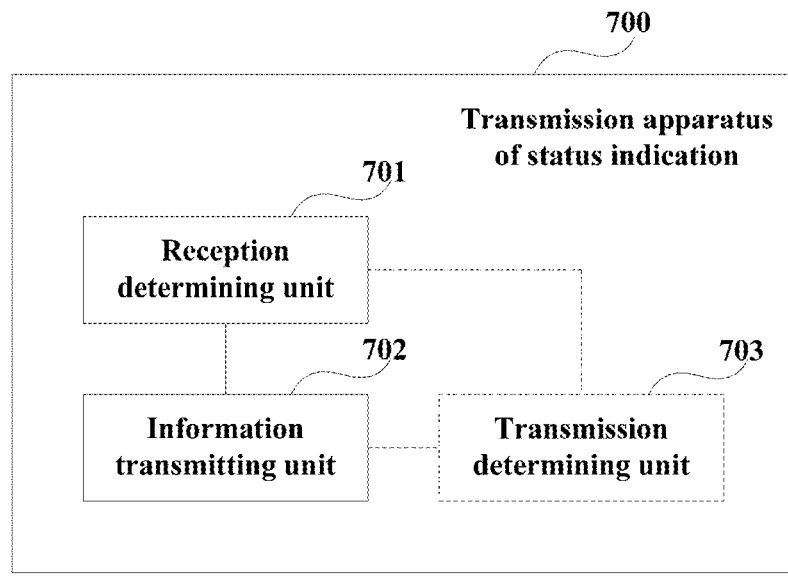

FIG. 7 is a schematic diagram of the transmission apparatus of status indication of the embodiment of this disclosure. As shown in FIG. 7, the transmission apparatus 700 of status indication includes:

a reception determining unit 701 configured to determine whether an RLC layer has successfully received all RLC PDUs of uplink data when the base station receives the uplink data transmitted by a UE; and an information transmitting unit 702 configured to transmit PDCCH information to the UE, in a case where the RLC layer has successfully received all the RLC PDUs of the uplink data; the PDCCH information is used to indicate that the uplink data have been successfully received and/or the UE is permitted to enter into a DRX status.

As shown in FIG. 7, the transmission apparatus 700 of status indication may further include:

a transmission determining unit 703 configured to determine whether there exist downlink data for the UE needing to be transmitted;

and the information transmitting unit 702 may further be configured to transmit first PDCCH information to the UE for indicating that the uplink data have been successfully received, in a case where the RLC layer has successfully received all the RLC PDUs of the uplink data and there exist downlink data for the UE needing to be transmitted.

The information transmitting unit 702 may further be configured to transmit second PDCCH information to the UE for indicating that the uplink data have been successfully received and the UE is permitted to enter into the DRX status, in a case where the RLC layer has successfully received all the RLC PDUs of the uplink data and there exists no downlink data for the UE needing to be transmitted.

The information transmitting unit 702 may further be configured to transmit third PDCCH information to the UE for indicating that the uplink data have been successfully received and the UE is permitted to enter into the DRX status after performing feedback, in a case where the RLC layer has successfully received all the RLC PDUs of the uplink data and there exists no downlink data for the UE needing to be transmitted.

In an embodiment, a newly-added field in a DCI format of a PDCCH may be used to carry the PDCCH information.

For example, the newly-added field may include a flag field; a value 0 of the flag field denotes that the newly-added field is used to carry the PDCCH information, or a value 1 of the flag field denotes that the newly-added field is used to carry the PDCCH information.

The newly-added field may further include a direct indication information field, a value of the direct indication information field denoting first PDCCH information, and another value of the direct indication information field denoting second PDCCH information.

Or, a value of the direct indication information field denotes first PDCCH information, and another value of the direct indication information field denotes third PDCCH information. And the newly-added field may further include a resource block assignment field, a value of the resource block assignment field being used to indicate resources used by the UE in performing the feedback.

In an embodiment, an existing field in the DCI format of the PDCCH may further be used to carry the PDCCH information.

For example, a value 0 of a repetition number field in the DCI format denotes first PDCCH information, and a value 0 of a subframe repetition number field in the DCI format denotes second PDCCH information. However, this disclosure is not limited thereto, and other existing fields may be used to carry the above PDCCH information.

It can be seen from the above embodiment that uplink data of the UE having been successfully received and/or the UE being permitted to enter into a DRX status is/are indicated by PDCCH information, which may not only reduce transmission of RLC status report and improve transmission efficiency of the whole system, but also the UE may be made to enter into the DRX status as fast as possible and power consumption of the UE may be lowered.

Embodiment 4

The embodiment of the present disclosure provides a transmission apparatus of status indication, configured in a UE. This embodiment corresponds to the transmission method in Embodiment 2, with the same contents being not going to be described herein any further.

Figure 8:
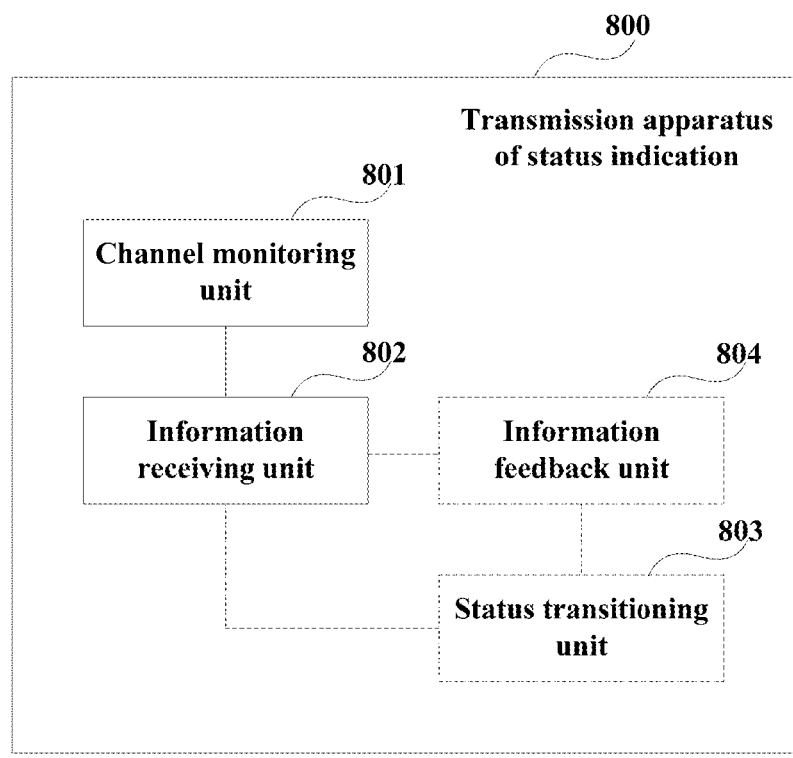

FIG. 8 is a schematic diagram of the transmission apparatus of status indication of the embodiment of this disclosure. As shown in FIG. 8, the transmission apparatus 800 of status indication includes:

a channel monitoring unit 801 configured to monitor a PDCCH after the UE transmits uplink data; and an information receiving unit 802 configured to receive PDCCH information transmitted by a base station via the PDCCH, the PDCCH information being used to indicate that the uplink data have been successfully received and/or the UE is permitted to enter into a DRX status.

In one implementation, the PDCCH information is first PDCCH information, and the information receiving unit 802 may further be configured to indicate to an RLC layer that the uplink data have been successfully received, and the monitoring unit 801 proceeds with monitoring the PDCCH.

In another implementation, the PDCCH information is second PDCCH information, and the information receiving unit 802 may further be configured to indicate to the RLC layer that the uplink data have been successfully received.

As shown in FIG. 8, the transmission apparatus 800 of status indication may further include:

a status transitioning unit 803 configured to control the UE to enter into the DRX status (such as entering into the DRX status immediately after receiving the second PDCCH information).

In a further implementation, the PDCCH information is third PDCCH information, and the information receiving unit 802 may further be configured to indicate to the RLC layer that the uplink data have been successfully received.

As shown in FIG. 8, the transmission apparatus 800 of status indication may further include:

an information feedback unit 804 configured to feed back information to the base station on a resource indicated by the third PDCCH information;

and the status transitioning unit 803 may further be configured to control the UE to enter into the DRX status after performing feedback (such as entering into the DRX status immediately after performing feedback).

In an embodiment, a newly-added field in a DCI format of a PDCCH may be used to carry the PDCCH information, or, an existing field in the DCI format of the PDCCH is used to carry the PDCCH information; however, this disclosure is not limited thereto.

It can be seen from the above embodiment that uplink data of the UE having been successfully received and/or the UE being permitted to enter into a DRX status is/are indicated by PDCCH information, which may not only reduce transmission of RLC status report and improve transmission efficiency of the whole system, but also the UE may be made to enter into the DRX status as fast as possible and power consumption of the UE may be lowered.

Embodiment 5

The embodiment of the present disclosure provides a communication system, with the same contents as those in embodiments 1-4 being not going to be described herein any further.

Figure 9:
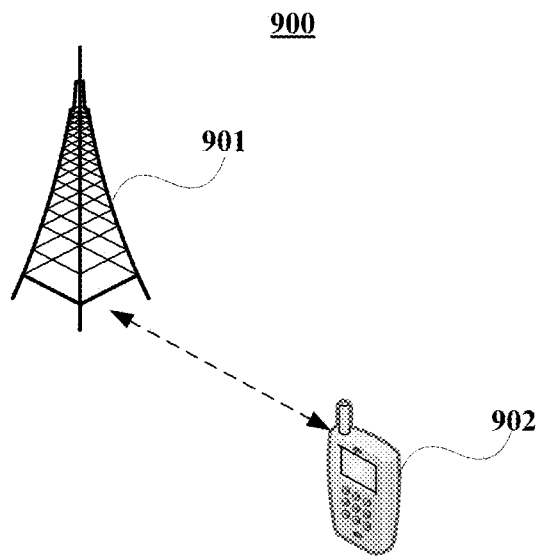

FIG. 9 is a schematic diagram of the communication system of the embodiment of this disclosure. As shown in FIG. 9, the communication system 900 includes a base station 901 and a UE 902. The base station 901 may be configured with the transmission apparatus 700 of status indication as described in Embodiment 3, and the UE 902 may be configured with the transmission apparatus 800 of status indication as described in Embodiment 4.

The embodiment of this disclosure further provides a base station.

Figure 10:
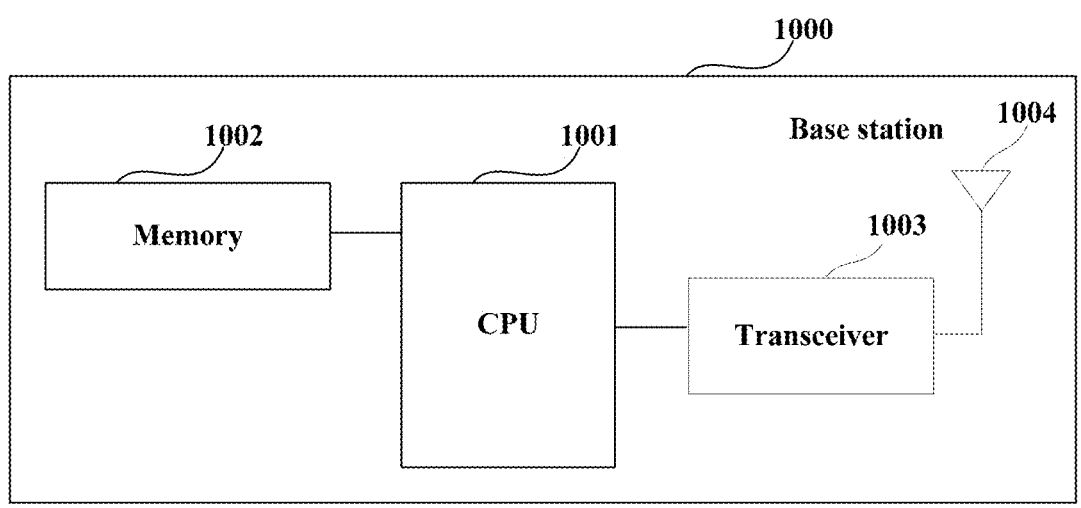

FIG. 10 is a schematic diagram of the base station of the embodiment of this disclosure. As shown in FIG. 10, the base station 1000 may include a central processing unit (CPU) 1001 and a memory 1002, the memory 1002 being coupled to the central processing unit 1001. The memory 1002 may store various data, and furthermore, it may store a program for information processing, and execute the program under control of the central processing unit 1001, so as to receive various information transmitted by the UE, and transmit request information to the UE.

In one implementation, the functions of the transmission apparatus 700 of status indication may be integrated into the central processing unit 1001. The central processing unit 1001 may be configured to carry out the transmission method of status indication as described in Embodiment 1.

For example, the central processing unit 1001 may be configured to perform the following control: determining whether an RLC layer has successfully received all RLC PDUs of uplink data when the uplink data transmitted by a UE are received; and transmitting PDCCH information to the UE, in a case where the RLC layer has successfully received all the RLC PDUs of the uplink data; the PDCCH information is used to indicate that the uplink data have been successfully received and/or the UE is permitted to enter into a DRX status.

In another implementation, the transmission apparatus 700 of status indication and the central processing unit 1001 may be configured separately. For example, the transmission apparatus 700 of status indication may be configured as a chip connected to the central processing unit 1001, with its functions being realized under control of the central processing unit 1001.

Furthermore, as shown in FIG. 10, the base station 1000 may include a transceiver 1003, and an antenna 1004, etc. Functions of the above components are similar to those in the relevant art, and shall not be described herein any further. It should be noted that the base station 1000 does not necessarily include all the parts shown in FIG. 10, and furthermore, the base station 1000 may include parts not shown in FIG. 10, and the relevant art may be referred to.

The embodiment of this disclosure further provides a UE.

Figure 11:
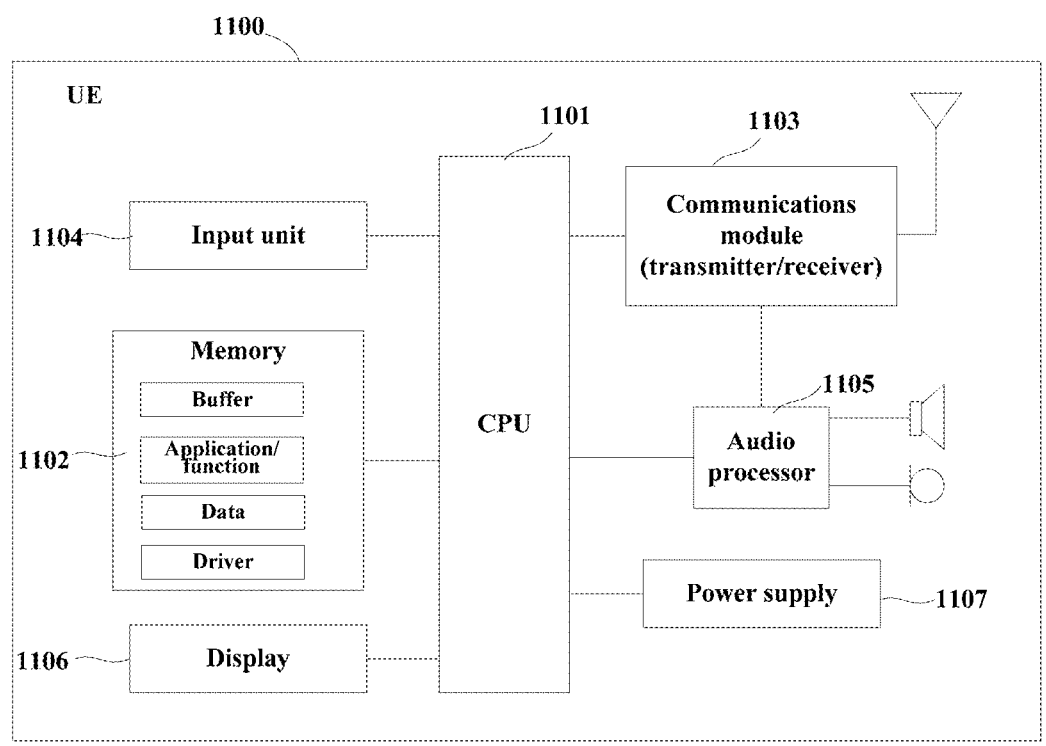

FIG. 11 is a schematic diagram of the UE 1100 of the embodiment of this disclosure. As shown in FIG. 11, the UE 1100 may include a central processing unit 1101 and a memory 1102, the memory 1102 being coupled to the central processing unit 1101. It should be noted that this figure is illustrative only, and other types of structures may also be used, so as to supplement or replace this structure and achieve a telecommunications function or other functions.

As shown in FIG. 11, the central processing unit 1101 is sometimes referred to as a controller or control, which may include a microprocessor or other processor devices and/or logic devices, and the central processing unit 1101 receives input and controls operations of every component of the UE 1100.

The central processing unit 1001 may be configured to carry out the transmission method of status indication as described in Embodiment 2. For example, the central processing unit 1101 may be configured to perform the following control: monitoring a PDCCH after transmitting uplink data; and receiving PDCCH information transmitted by a base station via the PDCCH, the PDCCH information being used to indicate that the uplink data have been successfully received and/or the UE is permitted to enter into a DRX status.

As shown in FIG. 11, the UE 1100 may further include a communication module 1103, an input unit 1104, an audio processor 1105, a display 1106 and a power supply 1107. It should be noted that the UE 1100 does not necessarily include all the parts shown in FIG. 11, and furthermore, the UE 1100 may include parts not shown in FIG. 11, and the relevant art may be referred to.

An embodiment of the present disclosure provides a computer readable program code, which, when executed in a base station, will cause the base station to carry out the transmission method of status indication as described in Embodiment 1.

An embodiment of the present disclosure provides a computer readable medium, including a computer readable program code, which will cause a base station to carry out the transmission method of status indication as described in Embodiment 1.

An embodiment of the present disclosure provides a computer readable program code, which, when executed in a UE, will cause the UE to carry out the transmission method of status indication as described in Embodiment 2.

An embodiment of the present disclosure provides a computer readable medium, including a computer readable program code, which will cause a UE to carry out the transmission method of status indication as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method for feeding back channel state information carried out in the apparatus for feeding back channel state information or the method for allocating resources carried out in the apparatus for allocating resources described with reference to the embodiments of this disclosure may be directly embodied as hardware, software modules executed by a processor, or a combination thereof. For example, one or more functional block diagrams and/or one or more combinations of the functional block diagrams shown in FIG. 7 (such as the reception determining unit, and the information transmitting unit, etc.) may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A transmission apparatus of status indication, configured in a base station, the transmission apparatus of status indication comprising:
a memory that stores a plurality of instructions; and
processor circuitry that couples to the memory and that is configured to execute the plurality of instructions to:
determine whether a radio link control (RLC) layer has successfully received all RLC protocol data units (PDUs) of uplink data when the base station receives the uplink data transmitted by a user equipment (UE); and
transmit physical downlink control channel (PDCCH) information to the UE, in a case where the RLC layer has successfully received all the RLC PDUs of the uplink data; wherein, the PDCCH information is used to indicate that the UE is permitted to enter into a discontinuous reception (DRX) status.

2. The transmission apparatus of status indication according to claim 1, wherein the processor circuitry is further configured to:
determine whether there exist downlink data for the UE needing to be transmitted;
transmit first PDCCH information to the UE for indicating that the uplink data have been successfully received, in a case where the RLC layer has successfully received all the RLC PDUs of the uplink data and there exist downlink data for the UE needing to be transmitted.

3. The transmission apparatus of status indication according to claim 2, wherein the processor circuitry is further configured to transmit second PDCCH information to the UE for indicating that the uplink data have been successfully received and the UE is permitted to enter into the DRX status, in a case where the RLC layer has successfully received all the RLC PDUs of the uplink data and there exists no downlink data for the UE needing to be transmitted.

4. The transmission apparatus of status indication according to claim 2, wherein the processor circuitry is further configured to transmit third PDCCH information to the UE for indicating that the uplink data have been successfully received and the UE is permitted to enter into the DRX status after performing feedback, in a case where the RLC layer has successfully received all the RLC PDUs of the uplink data and there exists no downlink data for the UE needing to be transmitted.

5. The transmission apparatus of status indication according to claim 1, wherein a newly-added field in a downlink control information (DCI) format of a PDCCH is used to carry the PDCCH information.

6. The transmission apparatus of status indication according to claim 5, wherein the newly-added field comprises a flag field;
wherein, a value 0 of the flag field denotes that the newly-added field is used to carry the PDCCH information, or a value 1 of the flag field denotes that the newly-added field is used to carry the PDCCH information.

7. The transmission apparatus of status indication according to claim 6, wherein the newly-added field further comprises a direct indication information field, a value of the direct indication information field denoting first PDCCH information, and another value of the direct indication information field denoting second PDCCH information.

8. The transmission apparatus of status indication according to claim 6, wherein the newly-added field further comprises a direct indication information field, a value of the direct indication information field denoting first PDCCH information, and another value of the direct indication information field denoting third PDCCH information.

9. The transmission apparatus of status indication according to claim 8, wherein the newly-added field further comprises a resource block assignment field, a value of the resource block assignment field being used to indicate resources used by the UE in performing the feedback.

10. The transmission apparatus of status indication according to claim 1, wherein an existing field in the DCI format of the PDCCH is used to carry the PDCCH information.

11. The transmission apparatus of status indication according to claim 10, wherein a value 0 of a repetition number field in the DCI format denotes first PDCCH information, and/or a value 0 of a subframe repetition number field in the DCI format denotes second PDCCH information.

12. A transmission apparatus of status indication, configured in a user equipment (UE), the transmission apparatus of status indication comprising:
a memory that stores a plurality of instructions; and
processor circuitry that couples to the memory and that is configured to execute the plurality of instructions to:
monitor a physical downlink control channel (PDCCH) after the UE transmits uplink data; and
receive PDCCH information transmitted by a base station via the PDCCH, the PDCCH information being used to indicate that the UE is permitted to enter into a discontinuous reception (DRX) status.

13. The transmission apparatus of status indication according to claim 12, wherein the PDCCH information is first PDCCH information, and the processor circuitry is further configured to indicate to a radio link control (RLC) layer that the uplink data have been successfully received.

14. The transmission apparatus of status indication according to claim 13, wherein the processor circuitry is configured to proceed with monitoring the PDCCH.

15. The transmission apparatus of status indication according to claim 12, wherein the PDCCH information is second PDCCH information, and the processor circuitry is further configured to indicate to an RLC layer that the uplink data have been successfully received.

16. The transmission apparatus of status indication according to claim 15, wherein the processor circuitry is further configured to:
control the UE to enter into the DRX status.

17. The transmission apparatus of status indication according to claim 12, wherein the PDCCH information is third PDCCH information, and the processor circuitry is further configured to indicate to an RLC layer that the uplink data have been successfully received.

18. The transmission apparatus of status indication according to claim 17, wherein the processor circuitry is further configured to:

feed back information to the base station on a resource indicated by the third PDCCH information; and control the UE to enter into the DRX status after performing feedback.

19. The transmission apparatus of status indication according to claim 12, wherein a newly-added field in a DCI format of a PDCCH is used to carry the PDCCH information;

or, an existing field in the downlink control information (DCI) format of the PDCCH is used to carry the PDCCH information.

20. A communication system, comprising:

a base station comprising a transmission apparatus of status indication, the transmission apparatus of status indication comprising:

a first memory that stores a plurality of first instructions; and first processor circuitry that couples to the first memory and is configured to execute the plurality of first instructions to:

determine whether a radio link control (RLC) layer has successfully received all RLC protocol data units (PDUs) of uplink data when the base station receives the uplink data transmitted by a user equipment (UE); and transmit physical downlink control channel (PDCCH) information to the UE, in a case where the RLC layer has successfully received all the RLC PDUs of the uplink data; wherein, the PDCCH information is used to indicate that the UE is permitted to enter into a discontinuous reception (DRX) status, and a UE transmission apparatus of status indication comprising:

a second memory that stores a plurality of second instructions; and second processor circuitry that couples to the second memory and is configured to execute the plurality of instructions to:

monitor a PDCCH after the UE transmits uplink data; and receive PDCCH information transmitted by a base station via the PDCCH, the PDCCH information being used to indicate that the UE is permitted to enter into a DRX status.

* * * * *